United States Patent Office 3,114,350
Patented Dec. 17, 1963

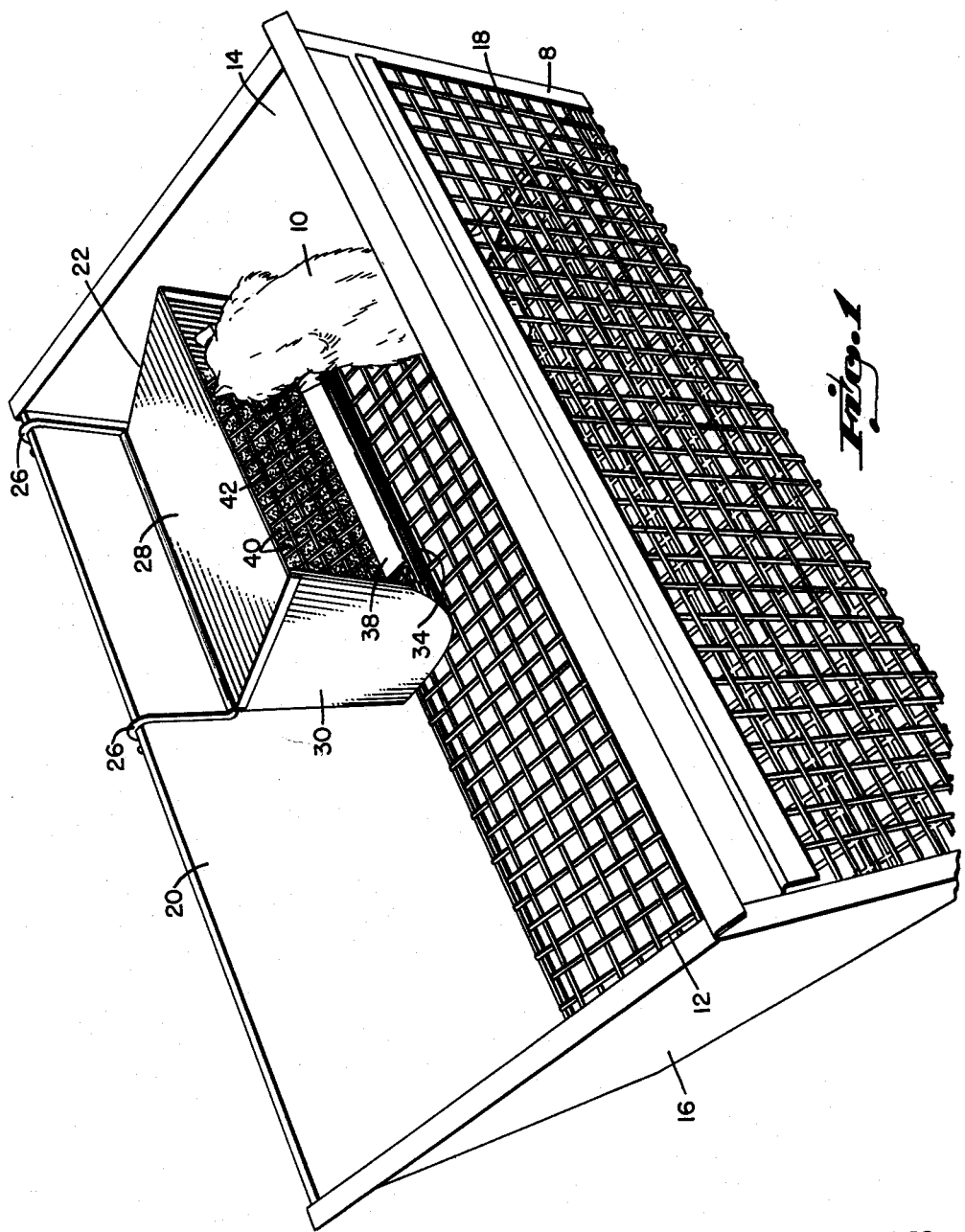

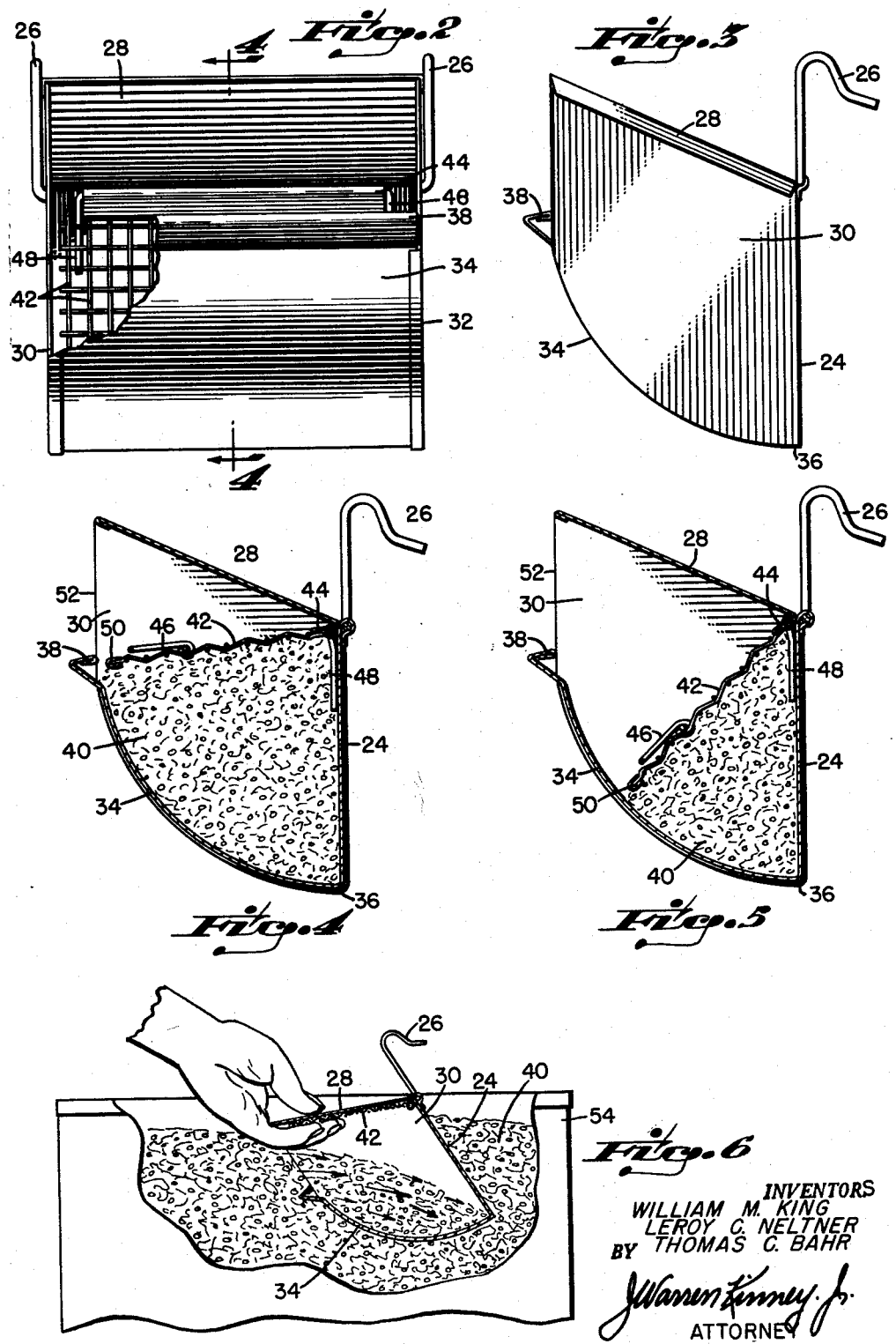

3,114,350
SMALL ANIMAL FEEDER
William M. King, 431 Deanview Drive, Cincinnati, Ohio;
Leroy C. Neltner, 36 Licking Pike, Newport, Ky.; and
Thomas Curt Bahr, 1834 Euclid Ave., Covington, Ky.
Filed Mar. 31, 1961, Ser. No. 99,741
4 Claims. (Cl. 119—51)

The present invention relates to a feeding device for experimental animals used in various studies of diseases, and the effects of experimental diets, drugs, and other treatments designed ultimately to benefit mankind. It is highly desirable in evaluating the effects of drug diets and the like, to eliminate errors and the possibility of misleading results occurring by reason of experimental animals urinating or defecating into their food, and thereby re-ingesting the drugs or foods, or metabolites thereof normally excreted in the urine or feces.

In long term feeding studies, it is essential also to determine exact food consumption, without losses due to spillage or the removal of food otherwise than by ingestion, and under conditions of utmost cleanliness.

Objects of the invention, therefore, are to provide an improved feeding device which cannot be overturned by the animal undergoing treatment; which may be cleaned and serviced with ease and care, leaving no crevices difficult to reach in cleaning; and which will inhibit animals from urinating or defecating into their food, and from scratching out or otherwise removing the food without ingestion.

Other objects are to provide an improved feeding device for the purposes stated, which will hold a maximum amount of food without likelihood of spillage, while at the same time conserving floor space in the animal cage; and the one which may be cleaned, serviced, and weighed with a minimum expenditure of time and labor on the part of the laboratory attendant.

Another object is to provide a drug diet feeder for experimental animals, which is simple and inexpensive to fabricate; which may be fitted to animal cages of various types currently in use; and which is easily adaptable to the feeding of many types of small experimental animals having differing food consumption habits.

The foregoing and other objects are attained by the means described herein and illustrated upon the accompanying drawings, in which FIG. 1 is a perspective view of an experimental animal cage, with cover removed, showing applied thereto a feeder embodying the improvements of the present invention.

FIG. 2 is a front elevational view of the feeder, partly broken away.

FIG. 3 is a side elevation of the same.

FIG. 4 is a cross-sectional view taken on line 4—4 of FIG. 2, showing the feeder fully charged with food.

FIG. 5 is a view similar to FIG. 4, showing the relationship of parts when the food is partly consumed.

FIG. 6 is a side elevational view indicating the manner in which the feeder may be charged with food from a bulk container.

Current trends in toxicology and safety evaluation concerning modern drugs and preparations have necessitated an increase in long term feeding studies of laboratory animals undergoing tests and observations. It has been determined that long term feeding experiments, in order to produce valid and reliable results, must be conducted under conditions of extreme care in feeding the laboratory animals and determining their food consumption with a high degree of accuracy. Of utmost importance also is the elimination of food contamination such as will occur if the animal is permitted access to food which has been exposed to animal excretions. In many instances, an animal may obtain an overdose of a drug fed to it by eating food contaminated by fecal matter or urine carrying some percentage of the original dosage, thereby to induce false test results and inaccurate observations and calculations. The elimination of such inaccuracies and test failures is an important objective of the present invention.

In the drawings, 8 indicates a typical cage for confining a laboratory animal such as a rat, mouse, or other rodent 10, the cover of the cage being removed in the interest of clarity of the disclosure. The cage will generally have a screened bottom or floor 12 to permit escape of droppings from the cage. Other portions of the cage likewise may be screened or perforated, such as the side walls 14 and 16, or the front and rear walls 18 and 20, if desired. In the example illustrated, only the floor and the front wall are perforated or screened, in accordance with rather common practice.

Indicated generally by the character 22 is the feeder, which may include a flat rear wall 24 depending from one or more hooks or brackets 26 whereby the feeder may be firmly supported within the cage by one of the cage walls 20, for example, with the rear wall of the feeder lying substantially flatwise against the supporting wall 20 of the cage. By preference, the hooks or brackets are of sufficient length to dispose the feeder but slightly above the cage floor, so that the caged animal may not enter between the feeder and the cage floor and thereby possibly displace the feeder with relation to the cage wall 20, although in practice the cage cover, when applied, will generally prevent such displacement.

The top wall or canopy 28 of the feeder may be in the form of a solid or imperforate plate meeting the upper edge of rear wall 24 at an obtuse angle, and fixedly related thereto. The purpose of inclining the canopy downwardly toward the rear wall 24 is to prevent the animals from resting atop the canopy and defecating or urinating there, the observation being that rodents dislike slanting surfaces as resting places.

Connecting the canopy ends and the ends of the rear wall of the feeder are the rigid imperforate side walls 30 and 32, arranged preferably in spaced parallelism, and adapted to support the arcuate imperforate front wall 34 of the feeder. If desired, the front wall may be formed integrally with rear wall 24, along the lower longitudinal edge 36, or as an alternative construction such walls may be separate parts joined rigidly along the edge 36. At the top of the front wall may be formed a longitudinal horizontal lip or ledge 38 providing a comfortable support for the forefeet of an animal removing food from the feeder, as in FIG. 1. It also serves as a deflector to prevent an animal from "splashing" out food from a full feeder.

In the several drawing views, the reference character 40 indicates feed in bulk form, offered as granules, pellets, shreds, or the like, which may contain a drug or preparation to be tested. In order to present the feed in a manner such as to avoid spillage, waste, or contamination as previously mentioned, a grid 42 is supported atop the feed material so as to move downwardly upon the top of the feed mass as the feed is removed through the interstices of the grid by the animal. FIG. 5 illustrates the manner in which the grid follows the feed level as the feed is consumed. The fully charged condition of the feeder is illustrated by FIG. 4.

Mobility of grid 42 may be provided for by attaching the grid to the rear wall 24 or to the underside of canopy 28, by means of one or more hinges 44 arranged along the rear edge of the grid. Downward movement of the grid may be gravitational, if desired, although in an alternative form of construction the grid may be spring actuated in the downward direction by any conventional spring means connected between the grid and other portions of the feeder. Opposite ends of a suitable hinge wire are indicated at 48. The numeral 46 denotes a loop of wire suitably attached to grid 42 for use as a handle to be grasped when raising the grid.

The size and shape of the grid openings may be altered as desired, to suit the size, nature, and eating habits of the animal being fed.

It may here be noted that the forward edge 50 of the grid when swung about its hinge, describes an arc which is in substantial conformity with the arcuacy of front wall 34, and proper clearance is provided so that the grid may swing without interference from the feeder front wall. In all positions of the grid, some degree of inclination is present so as to discourage any desire on the part of the animal to use the grid as a resting place, should the animal by any chance be able to enter the feeder through the access opening 52 at the front of the feeder. The size of the access opening 52 may be regulated, if desired, by bending the front wall lip or ledge 38 upwardly or downwardly, as circumstances may suggest.

In FIG. 6 is illustrated a supply of feed within a large container 54, into which the feeder of the present invention may be immersed for charging. As the drawing indicates, it is a quick and easy operation to charge the feeder by simply holding the grid 42 up against the underside of the canopy 28 while scooping the feed into the feeding device to the extent necessary for filling. After charging, the feeder readily may be weighed before placing it within the animal cage 8. The weighing operation may be performed also prior to charging the feeder, thereby taking into account any residual food not previously consumed by the animal.

From the foregoing disclosure, it should readily be appreciated that the improved feeder of this invention possesses features of merit inducive to the achievement of greater accuracy and dependability in the conduct of drug diet tests and the like in which the lower animals are subjects. In addition, the feeder is simple and economical to manufacture and its use entails a minimum expenditure of time and effort on the part of a laboratory attendant in charge of maintenance or care during the test period.

It is to be understood that the feeder may be constructed of metal or any other suitable material, and that various modifications and changes in structural details may be resorted to, within the scope of the appended claims, without departing from the spirit of the invention.

What is claimed is:

1. A drug diet feeder for experimental animals, comprising a feed container having a substantially vertical rear wall, spaced side walls and an arcuate front wall joined to and extending forwardly and upwardly from the lower part of said rear wall in an uninterrupted arc beginning at the rear wall, said front wall lying between and joined at opposite sides to said side walls, said side walls rising above the top edge of the front wall and having vertical front edges rising from the top edge of said front wall, a canopy joined to and lying between the side walls and extending upwardly and forwardly from and joined to said rear wall, the canopy having a front edge lying over and vertically spaced from the top edge of the front wall, to form an access opening, a flat grid disposed longitudinally of an within the container between the side walls and having forward and rearward edges substantially paralleling the front and rear walls, and a hinge connection between the rearward edge of the grid and the rear wall pivoting the grid at the center of curvature of said front wall for vertical swinging of the grid on an axis paralleling and lying closely adjacent to the rear wall and said grid having a transverse dimension between its forward and rearward edges substantially corresponding to the radius of the arc of the front wall whereby the forward edge of the grid will sweep down over and in close proximity to the inner surface of the front wall as feed is depleted in the container and the grid completely covers all of the feed in the container until the feed is completely consumed.

2. The invention according to claim 1, wherein said canopy and rear wall form an obtuse angle and said axis lies in said angle.

3. The invention according to claim 2, wherein said grid when swung to its limit of movement upwardly lies flat against the underside of the canopy and the forward edges of the canopy and grid may be grasped together to facilitate using the container as a scoop to fill the same.

4. The invention according to claim 1, wherein a top edge portion of the forward wall is folded to form a ledge-like lip.

References Cited in the file of this patent
UNITED STATES PATENTS

| | | |
|---|---|---|
| 1,089,011 | Ruggles | Mar. 3, 1914 |
| 1,191,184 | Hooper | July 18, 1916 |
| 1,836,488 | Munson | Dec. 15, 1931 |
| 2,252,348 | Mager | Aug. 12, 1941 |
| 2,874,678 | Bradley | Feb. 24, 1959 |

FOREIGN PATENTS

| | | |
|---|---|---|
| 164,639 | Great Britain | June 16, 1921 |